Patented Oct. 22, 1940

2,218,649

UNITED STATES PATENT OFFICE 2,218,649

TREATMENT OF CRACKED RESIDUUM

Rudolph C. Laatsch, Chicago, Ill., assignor to Universal Oil Products Company, Chicago, Ill., a corporation of Delaware No Drawing. Application April 27, 1939, Serial No. 270,444

7 Claims. (Cl. 196—39)

This invention is concerned with the treatment of heavy residual fuel oils and more particularly, with a method of preventing the formation of sludge during storage and handling of such oils prior to use.

The oils processed according to the present invention are normally those produced during the cracking of petroleum oils and blends of such oils with uncracked residues. In certain cases, oils from other sources, such as those produced from coal tars, shale oils, and the like, may be processed.

In one specific embodiment the invention comprises heating cracked residual oil in the presence of an oxygen-containing gas with a minor amount of salicylic acid at temperatures within the range of approximately 200°–500° F., and separating the treated oil from the sludge formed.

It is known that some cracked residual oils or blends thereof with a straight-run oil, tend to develop sludge-like materials upon storage for considerable lengths of time. The sludge separates on standing, forming troublesome deposits in storage tanks, on the heating coils which are sometimes used in fuel bunkers to keep the oil fluid, and in burner parts. The exact reason for sludge formation is not known but may be connected in some way with oxidation and polymerization reactions involving the unsaturated hydrocarbon content of the residues, or possibly with the tendency of asphaltic materials to precipitate when cracked and straight-run oils are mixed. Whatever the explanation, it is well known that certain oils have poor storage stability and cannot be marketed because of this tendency to develop sludge. It is the purpose of this invention to provide a means to stabilize such oils against sludge formation.

I have found that the addition of from approximately 0.01%–0.5% of salicylic acid followed by heating in the presence of an oxygen-containing gas at a temperature within the range of approximately 200° and 500° F., results in the deposition of sludge-forming materials so that when the oil is cooled to approximately atmospheric temperature, the sludge can be separated. The time of heating depends to a certain extent on the instability of the oil, the temperature, the amount of air or oxygen used, and the degree of contact of the oxygen-containing gas with the oil. For amounts of air ranging between 80 and 800 cu. foot per barrel per hour times of approximately 30 minutes to 3 hours are usually sufficient. The resulting oil is stable in storage even at elevated temperatures for considerable lengths of time. The manner in which the sludge and treated oil are separated is not a special feature of the invention and may include centrifuging the oil. Another method is gravity settling, whereby the sludge drops out in a cone-bottomed vessel and the oil is separated from it by drawing off the upper layer. The sludge may be removed from the settler by mechanical methods or by heating sufficiently to melt and withdraw it from the tank. As a modification of these methods, the major portion of the sludge can be separated by gravity settling, and the remainder removed by centrifuging.

The following examples are given to illustrate the invention but should not be interpreted as limiting it to the exact conditions given therein.

Example 1

A West Texas cracked fuel oil was found to develop 1.2% sludge upon storage for 30 days at 120° F., as measured by the standard B. S. & W. test (ASTM designation D96–35) which consists in diluting the oil with equal parts of benzene and centrifuging for a period sufficient to give a constant reading in the centrifuge tube. To this residue was added 0.1% of salicylic acid, and the mixture was heated for two hours at 285° F., while air was bubbled through the mixture. The treated oil was separated from the sludge by centrifuging. The sludge amounted to 1.6% of the original oil. After storage for 30 days at 120° F., the stabilized fuel oil was found to contain 0.10% B. S. & W. When merely blown with air in the absence of salicylic acid under identical conditions, centrifuged, and stored for 30 days at 120° F. the fuel oil was found to contain 0.4% B. S. & W. It was possible to stabilize the oil by blowing it with air for a period of 5 hours under the same conditions as used above followed by centrifuging. The resulting oil contained 0.15% B. S. & W. after 30 days storage at 120° F.

Example 2

A blend of a Mid-Continent cracked residual fuel oil with 25% of straight-run fuel oil of Bunker "C" (ASTM grade 6) specifications having a Furol viscosity at 122° F., of 100 seconds, was found to develop 0.9% of B. S. & W. during storage for 60 days at 120° F. The oil was air blown for one hour with 0.1% of salicylic acid at 300° F. and centrifuged to separate the sludge. After 60 days storage thereafter at 100° F. the B. S. & W. content of the treated oil was 0.1%.

When blown with air alone under identical conditions and the treated oil separated and stored, the B. S. & W. content after 60 days was 0.50%.

I claim as my invention:

1. A process for stabilizing residual hydrocarbon oil containing sludge-forming substances which comprises heating said oil in the presence of salicylic acid and an oxygen-containing gas at a temperature of about 200–500° F, and separating the treated oil.

2. A process for stabilizing cracked residual hydrocarbon oil containing sludge-forming substances which comprises heating said oil in the presence of salicylic acid and an oxygen-containing gas at a temperature of about 200–500° F., and separating the treated oil.

3. A process for stabilizing blended high-boiling cracked and straight-run hydrocarbon residues containing sludge-forming substances which comprises heating said blended residue in the presence of salicylic acid and an oxygen-containing gas at a temperature of about 200–500° F., and separating the treated oil.

4. The process of claim 1 wherein the amount of salicylic acid used is within the range of approximately 0.01–0.5% by weight.

5. A method for stabilizing residual hydrocarbon oil which comprises dissolving in said oil 0.01–0.5% by weight of salicylic acid, heating to a temperature within the range of approximately 200–500° F., intimately contacting with the salicylic acid-containing oil an oxygen-containing gas for a time sufficient to effect separation of sludge-forming bodies contained therein, and separating the treated oil.

6. A method for stabilizing residual hydrocarbon oils against sludge formation which comprises treating the oil with salicylic acid and an oxygen-containing gas in amounts and at a temperature suitable for effecting deposition of sludge-forming substances, and separating said substances from the thus treated oil.

7. A method for stabilizing residual hydrocarbon oils against sludge formation which comprises subjecting the oil at a temperature of about 200–500° F. to the action of an oxygen-containing gas and a relatively small amount of salicylic acid, whereby to cause deposition of sludge-forming substances contained in the oil, and separating said substances from the thus treated oil.

RUDOLPH C. LAATSCH.